(No Model.)

E. KEMPSHALL.
SNAP HOOK.

No. 263,340.  Patented Aug. 29, 1882.

Witnesses.
Chas. L. Burdett.
James J. Greene.

Inventor.
Eleazer Kempshall
By W. E. Simonds
Atty

UNITED STATES PATENT OFFICE.

ELEAZER KEMPSHALL, OF NEW BRITAIN, CONNECTICUT.

SNAP-HOOK.

SPECIFICATION forming part of Letters Patent No. 263,340, dated August 29, 1882.

Application filed April 22, 1881. (No model.)

*To all whom it may concern:*

Be it known that I, ELEAZER KEMPSHALL, of New Britain, in the county of Hartford and State of Connecticut, have invented a certain new and useful Improvement in Snap-Hooks, of which the following is a description, reference being had to the accompanying drawings, where—

Figure 1:
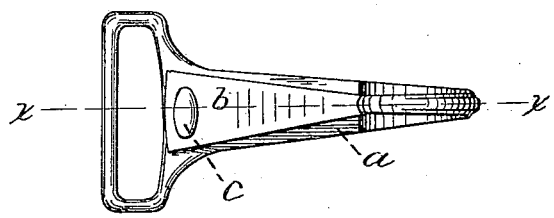
Figure 2:
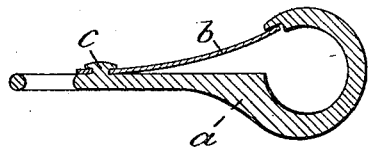

Figure 1 is a top view of a snap-hook embodying said improvement. Fig. 2 is a view of same in central vertical longitudinal section on plane $x\ x$.

The improvement consists in the detail or the construction of one of that class of snap-hooks which has a spring-tongue—that is, in a rivet of peculiar form, made of malleable material and as a part of the snap-body, located in a certain way upon the body of the snap and correspondingly connected to the spring which forms the tongue, with the resulting advantages that but one rivet need be used for the purpose. That one is peculiarly adapted in shape for use with the broadened base of the spring; it gives a large and strong rivet without encroaching upon the length of the spring; the labor of heading down more than a single rivet is saved; and the rivet gets a broad grasp upon the spring transversely thereof, making it impossible to start the spring from its fastening by any use that a snap is likely to be subjected to.

The letter $a$ denotes the snap-body, $b$ the spring which forms the tongue, and $c$ a rivet cast integral with the snap-body, both snap-body and rivet being of malleable iron, so that the rivet can be headed down. The peculiarity of this rivet is that its axis transversely of the spring is longer than its axis at right angles to this, the rivet-hole in the spring being correspondingly shaped and located. By the use of a rivet of this shape in this connection I avoid the cost of more than one rivet and the labor of heading down more than one rivet. The shape and location of the rivet is the best for the purpose of preventing side "wabbling" of the tongue and adapted to the shape of the broadened base of the tongue. This rivet gives a large and strong grasp on the tongue without encroaching on the length of its play, which it would if the position of the axes were reversed. The broad grasp a rivet of this shape and location gets upon the tongue makes it impossible to start the spring from its fastening by any use that a snap-hook is likely to get.

When in the following claim I use the word "oblong" I mean a figure of curved, not rectangular, outline, for the rectangular would present corners or angles favorable to splits in the tongue.

I claim as my improvement—

In an improved snap-hook, the spring-tongue having at the attaching end an oblong rivet-hole, in combination with the body portion, provided with an integral oblong rivet set transversely of the body, whereby the tongue is held more securely from lateral movement, as set forth.

ELEAZER KEMPSHALL.

Witnesses:
 ANDREW E. HULL,
 EBENEZER C. KEMPSHALL.